United States Patent
Nothofer et al.

(10) Patent No.: US 6,796,743 B2
(45) Date of Patent: Sep. 28, 2004

(54) INTERNAL LINE FOR FASTENING CABLES IN A WASTE-WATER PIPE

(75) Inventors: Klaus Nothofer, Erkrath (DE); Hans-Detlef Leppert, Mönchengladbach (DE); Wolfgang Teschner, Wunstorf (DE)

(73) Assignee: Alcatel, Paris (FR)

( * ) Notice: Subject to any disclaimer, the term of this patent is extended or adjusted under 35 U.S.C. 154(b) by 0 days.

(21) Appl. No.: 10/179,286

(22) Filed: Jun. 26, 2002

(65) Prior Publication Data

US 2003/0002923 A1 Jan. 2, 2003

(30) Foreign Application Priority Data

Jun. 27, 2001 (EP) ............................................ 01440195

(51) Int. Cl.[7] ................................................. F16L 7/00
(52) U.S. Cl. ............................... 405/183.5; 405/150.1; 405/184.2; 138/108; 264/36.16; 264/36.17; 264/267; 264/314; 156/156; 156/287; 156/295
(58) Field of Search ........................... 405/154.1, 156, 405/184.1, 184.2, 150.1, 150.2, 183.5, 146; 138/97, 98, 103, 104, 108; 264/36.16, 36.17, 36.22, 267, 269, 314; 156/94, 156, 287, 295

(56) References Cited

U.S. PATENT DOCUMENTS

| | | | | |
|---|---|---|---|---|
| 5,172,730 A | * | 12/1992 | Driver | ........................ 138/104 |
| 5,280,811 A | * | 1/1994 | Catallo et al. | ................ 138/98 |
| 5,305,798 A | * | 4/1994 | Driver | .......................... 138/98 |
| 5,480,260 A | * | 1/1996 | Shattuck et al. | .......... 405/154.1 |
| 6,463,960 B1 | * | 10/2002 | Madhani et al. | ............... 138/98 |
| 2001/0043839 A1 | * | 11/2001 | Prusak | .................... 405/184.2 |

FOREIGN PATENT DOCUMENTS

| | | | | |
|---|---|---|---|---|
| DE | WO 9832043 | | 7/1998 | |
| DE | 29814270 U1 | | 1/1999 | |
| DE | 29815744 U1 | | 1/1999 | |
| DE | 29817126 U1 | | 1/1999 | |
| DE | 19825325 A1 | | 1/2000 | |
| EP | 0953162 B1 | | 11/1999 | |
| EP | 964106 | * | 12/1999 | |
| GB | 2154808 | * | 9/1985 | |
| JP | 02095114 | * | 4/1990 | ................... 174/37 |
| JP | 03270613 | * | 12/1991 | .......... 154/134.3 FT |
| JP | 06339216 | * | 12/1994 | |
| JP | 09207216 | * | 8/1997 | |
| JP | 11205934 | * | 7/1999 | |

* cited by examiner

Primary Examiner—Jong-Suk (James) Lee
(74) Attorney, Agent, or Firm—Sughrue Mion, PLLC

(57) ABSTRACT

For the purpose of fastening cables to the inner wall of a non-accessible waste-water pipe, an internal liner has been developed, which is constructed from at least two layers, the first layer, which rests against the internal wall of the pipe when in the laid condition, having a profile or empty spaces for receiving cables, and a second layer, of envelope-like type, which carries the first layer.

6 Claims, 2 Drawing Sheets

INTERNAL LINE FOR FASTENING CABLES IN A WASTE-WATER PIPE

BACKGROUND OF THE INVENTION

The invention is based on a priority application EP01440195.4 which is hereby incorporated by reference.

The invention relates to an internal liner for fastening cables, and also to a method of laying an internal liner.

The use of waste-water, rainwater or mixed-water conduits or other discharge or supply lines for laying communication cables is one possible way, which has already been used, of reducing underground construction costs for the connection of subscribers (access). In addition, it makes possible to expand such connection of subscribers in a demandorientated and rapid manner; something which has become increasingly important of late because of the large number of operators. In what follows, the term "waste-water conduit" (waste-water pipe) is also intended to cover rainwater conduits, mixed-water conduits and discharge and supply lines. Whereas it is possible, in case of accessible conduits, to employ the existing standard techniques for laying communication cables, the problems in case of inaccessible conduits are still unresolved to a very great extent.

When laying cables in inaccessible waste-water conduits, care has to be taken to ensure that the hydraulically usable cross-sectional area is only slightly reduced;

as far as possible, no objects must be laid transversely to the direction of flow;

no points of attachment are produced which can lead to the formation of snags (for example, the accumulation of sewage materials) and consequently to obstruction; and that cleaning of the waste-water conduit is not prevented.

A fastening element, with the aid of which telecommunication cables can be held in waste-water conduits, is known from EP 953 162. This known fastening element consists of a resiliently pretensioned, closed stainless-steel ring which presses against the internal wall of the wastewater conduit. By using already existing, inaccessible conduit or pipe systems, such as the waste-water system or gas-pipe installations for example, the light wave guide cables can be laid right into the individual buildings in a simple manner. Laying is carried out with the aid of a remotely controllable conduit robot which takes the cables into the conduit and pipe systems and fastens them to the internal walls, taking the known fastening elements out of a magazine which is conveyed with it. Fastening elements of this kind, such as are described in EP 953 162, can only be laid with the aid of remotely controllable conduit robots. They therefore cannot be adapted for waste-water conduits which have such a small diameter (smaller than 20 cm) that no robot can be introduced. Yet it is precisely in the so-called "last mile", that is to say the lateral stretch which ends at a final consumer's building, that the demand for laying telecommunications cables is very high.

SUMMARY OF THE INVENTION

The object underlying the invention is to develop internal liners which permit the fastening of cables to the internal wall of a pipe, and also satisfactory renovation of the latter, without impairing the free space of the waste-water pipe too much in the process.

The object is achieved, according to the invention, by means of an internal liner for fastening cables to the internal wall of a pipe, preferably an inaccessible waste-water pipe, wherein the internal liner is constructed from at least two layers: the first layer, resting against the internal wall of the pipe when in the laid condition and having a profile or empty spaces for receiving cables, and the second layer, of envelope-like type, which carries the first layer; and a method of laying an internal liner against the internal wall of a pipe, preferably an inaccessible waste-water pipe, wherein an internal liner for fastening cables to the internal wall of the pipe, which is constructed from at leas two layers, the first layer, resting against the internal wall of the pipe when in the laid condition and having a profile or empty spaces for receiving cables, and the second layer, of envelope-like type, which carries the first layer, is introduced, closed at one end in a hose-like manner, into the pipe in the desired position, and is brought into the inflated condition with the aid of an element such as hot water, steam or infrared irradiation, until the internal liner is pressed against the internal wall of the pipe.

The construction of internal liners from two layers, a first layer which is provided with a profile for laying cables, preferably telecommunication cables, and a second, envelope-like layer, simultaneously permits the renovation of lateral waste-water pipes having a typically small diameter and also the laying of cables, preferably telecommunication cables, against the internal wall of such pipes. The formation of profiles for holding telecommunication cables inside this first layer prevents points of disturbance from being formed on the renovated internal wall, through the fact that the internal periphery of the internal liner remains uniform.

Advantageous refinements of the invention emerge from the dependent claims, the following description and the drawings.

BRIEF DESCRIPTION OF THE DRAWINGS

An exemplified embodiment of the invention will now be explained with the aid of FIGS. 1 to 6, in which.

DETAILED DESCRIPTION OF THE DRAWINGS

Figure 1:
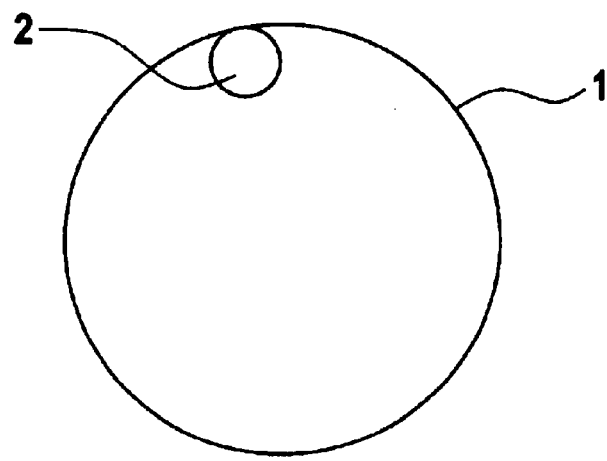
FIG. 1 shows a cable according to the prior art, laid in a pipe.

FIG. 1 is a cross-section of a pipe 1, for example a waste-water pipe, with a cable which is laid against the internal wall of the said pipe 1 with the aid of drilling and dwelling methods. A method of this kind is naturally only possible in accessible waste-water conduits or ones with a diameter which is sufficiently large to permit the introduction of a robot.

Figure 2:
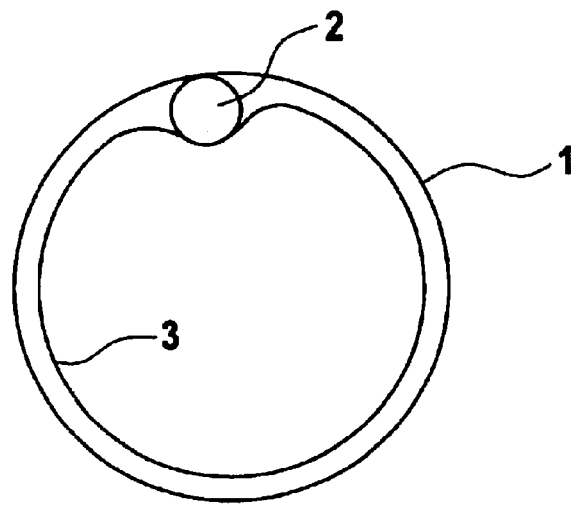
FIG. 2 shows a cross-section of a pipe with an internal liner according to the prior art.

The drawing in FIG. 2 is a cross-section of a pipe 1, together with an inserted internal liner 3, such as is known from the prior art. An internal liner 3 of this kind could be employed, even without a robot, through the fact that it is formed in a hose-like manner and is inflated in the pipe 1. When that happens, the internal liner 3 will hold the cable 2 against the internal wall of the pipe 1. However, it can be clearly perceived that the internal liner 3 partially surrounds the cable and this results in a certain irregularity in the periphery of the renovated pipe 1. This can lead to considerable problems during the use of the renovated pipe 1, such as, for example, the formation of snags.

Figure 3:
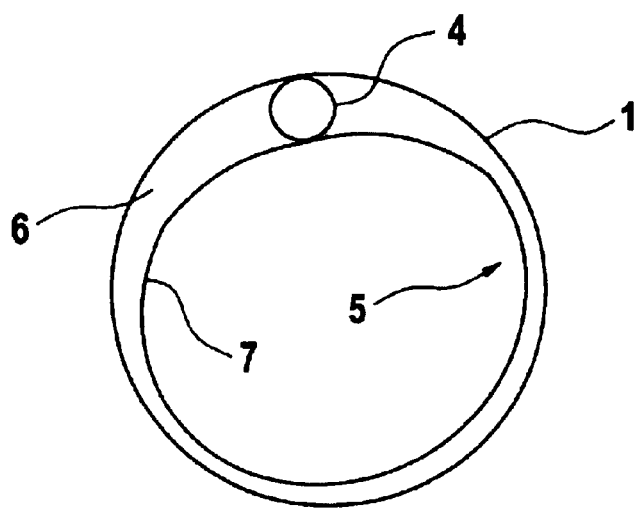
FIG. 3 shows a cross-section of a pipe with an internal liner according to the invention.
Figure 4A:
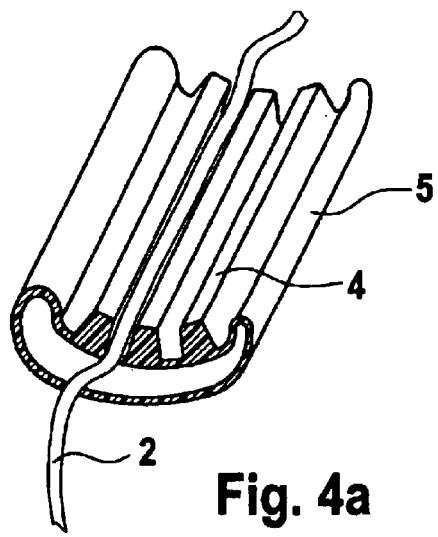
FIGS. 4a and 4b show a view of the internal liner, with two different configurations of the profile.
Figure 4B:
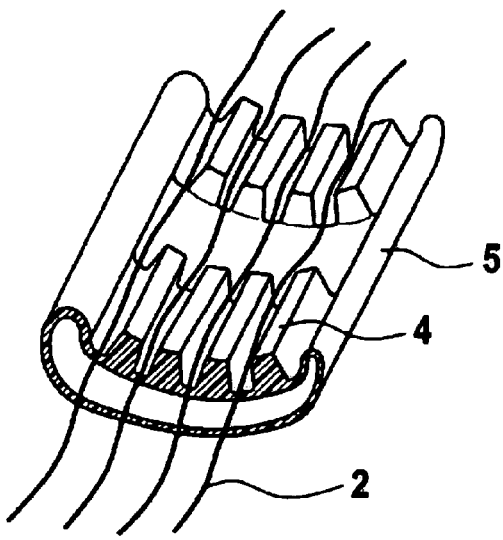
Figure 6:
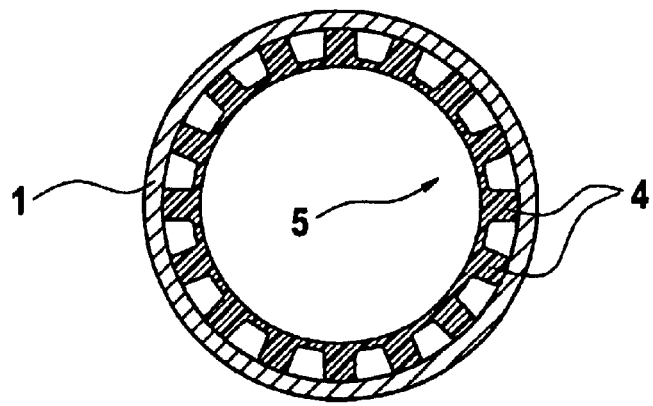
FIG. 6 shows a cross-section of the internal liner with an alternative configuration of the profile.

The drawing in FIG. 3 shows a pipe 1, preferably a waste-water pipe, in cross-section, with an internal liner 5 according to the invention. The said internal liner 5 consists of two layers, the first layer having a profile 4 for receiving cables or empty spaces and being carried by a second, envelope-like layer 7. The profile 4 may optionally be distributed over the entire periphery of the internal liner 5 (see FIG. 6). The first layer 6 consists of a carrying layer of fabric which is, for example, impregnated with thermosetting resin in which the profile 4 is applied. Under these circumstances, the said profile 4 can be applied either at the factory or else at the construction site before the laying of the said internal liner 5. The first layer 6 has similar elasticity to the second, envelope-like layer 7, the said first layer 6 having to prevent subsequent bulging of the internal liner 5 when in the laid condition. In this instance, the profile 4 may also be contoured in such a way that it is also possible for cables to be introduced subsequently into the empty spaces. Moreover, the profile may be distributed at certain points or else over the entire periphery. The profile 4 is designed in such a way that there is a possibility, at intervals in the longitudinal direction, of being able to make a change in direction (change in position) of the cables or empty spaces by means of interruptions (sector by sector, see FIG. 4b). This is important if (lateral) inlets are located in the conduit at the sides.

In order to lay an internal liner 5 according to the invention against the internal wall of a pipe 1, it is introduced into the said pipe 1, optionally together with the cables (see FIG. 4a) which are placed in the profile at the desired position. The said internal liner 5 can be inflated, since the second, envelope-like layer 7 is closed at one end. The said layer 7 can be impregnated with thermosetting plastic material, such as epoxide or resin for example. The second, envelope-like layer 7 is then subjected, in the desired position in the pipe 1, to hot water or steam, and optionally infrared irradiation, and thereby inflated. The internal liner 5 is thus placed against the internal wall of the conduit. In the process, the profile 4 is pressed against the said internal wall. If cables have not been introduced simultaneously with the insertion of the internal liner 5 in the pipe 1, the said cables, such as telecommunications cables, for example light wave guides, can be introduced into the empty spaces after the thermosetting operation. Pulling aids, for example auxiliary cords, may optionally be pre-installed for this purpose (see FIG. 4b).

Figure 5:
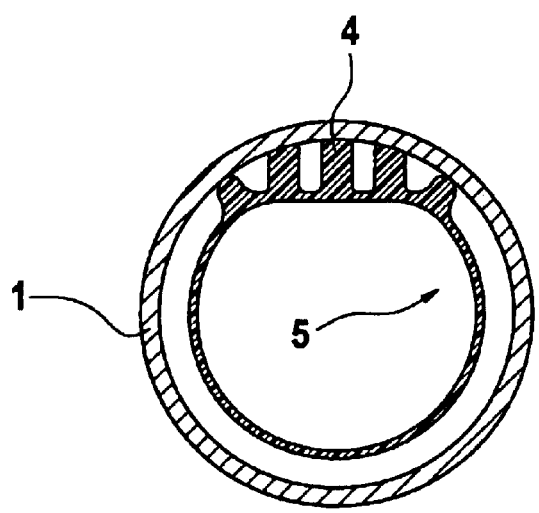
FIG. 5 shows a cross-section of the internal liner according to FIGS. 4a and 4b.

Internal liners 5 of this kind according to the invention can be used for renovating pipes, preferably inaccessible waste-water pipes. In addition, internal liners of this kind according to the invention serve as a fastening system for cables which are to be laid in pipes of this kind. Under these circumstances, the fastening system may be distributed over the entire length of the pipe or else only point by point at short intervals. If it is planned to also include empty spaces in the first layer of the internal liner 5 according to the invention, additional cables may also be introduced into the pipe 1 in a later process. What is important, in that case, is that the internal liner 5 remains perfectly regular over its entire periphery, such as is shown in the cross-section in FIG. 5. This prevents the subsequent formation of blockages.

What is claimed is:

1. An internal liner for fastening cables to an internal wall of a pipe, comprising an inflatable annular member, the inflatable annular member comprising:
    an outer surface that presses against the internal wall of the pipe when in a laid condition, the outer surface having protrusions projecting radially outwardly that define a channel for receiving a cable, the channel extending in an axial direction of the internal liner; and
    an inner surface that is continuous and located at a substantially constant radial distance from a center of the annular member when inflated within the pipe.

2. The internal liner according to claim 1, wherein the protrusions projecting radially outwardly define a plurality of channels for receiving cables, the plurality of channels extending in an axial direction of the internal liner.

3. The internal liner according to claim 2, wherein the plurality of channels include a break permitting a cable extending in one of the channels to switch over to another channel at the break.

4. The internal liner according to claim 2, wherein the plurality of conduits include a break permitting a cable extending in one of the conduits to switch over to another conduit at the break.

5. A pipe assembly, comprising:
    a pipe having an internal wall, and
    an internal liner, comprising an annular member and a cable, the annular member comprising:
        an outer surface that presses against the internal wall of the pipe, the outer surface having protrusions projecting radially outwardly that define a channel in which the cable is received, the channel extending in an axial direction of the internal liner; and
        an inner surface that is continuous and located at a substantially constant radial distance from a center of the annular member when inflated within the pipe.

6. The pipe assembly according to claim 5, wherein the internal liner is inflatable prior to being pressed against the internal wall of the pipe.

* * * * *